May 5, 1970  O. R. HEINE  3,510,869
GASEOUS DISCHARGE POSITION DIGITAL ENCODER
Filed Dec. 19, 1966  2 Sheets-Sheet 1

INVENTOR
OTTO R. HEINE
BY Samuel Lindenberg
Abraham Wasserman
ATTORNEYS

INVENTOR
OTTO R. HEINE

United States Patent Office 3,510,869
Patented May 5, 1970

3,510,869
**GASEOUS DISCHARGE POSITION
DIGITAL ENCODER**
Otto R. Heine, 1418 Butler St.,
Los Angeles, Calif. 90025
Filed Dec. 19, 1966, Ser. No. 603,041
Int. Cl. G08c 9/00
U.S. Cl. 340—347                            9 Claims

ABSTRACT OF THE DISCLOSURE

A gaseous discharge position digital encoder is disclosed in which a rotatable or movable coded member having coded conductive and nonconductive surface portions is mounted in a gas-tight container filled with a gas which breaks down or discharges to provide a virtual short when subjected to a sufficiently high potential difference. Electrical probes are also positioned within the container. For each position of the coded member, different probes are closest to conductive surface portions providing a sufficiently high potential difference thereacross, so that the gas thereat breaks down, shorting the probes to the disc and thereby providing a signal of a first potential value while probes near nonconductive surface portions are not shorted providing a signal of a different potential value.

BACKGROUND OF THE INVENTION

Field of the invention

This invention relates to position encoders and, more particularly, to position digital encoders employing breakdown properties of gases.

Description of the prior art

Among the presently known angular position digital encoders various mechanical and/or optical techniques are employed. Some employ brushes which are in physical contact with a rotating coded disc, having conductive and nonconductive surface portions. The output signals are produced as a function of the physical contacts between the brushes and the conductive surfaces. Encoders using such a technique suffer from the disadvantage of brush wear due to friction, requiring replacement, as well as periodic maintenance.

On the other hand, encoders using optical techniques, though eliminating the effect of friction, have the disadvantage of requiring a constant power-consuming light source, and the fact that in such an encoder the output signals are produced by small photosensitive elements which often need to be replaced. Also, the signals for such elements are quite low, so that they generally must be amplified before being utilized, thereby requiring added circuitry, which in addition to cost decrease the overall reliability of the encoder. It is to overcome such disadvantages that the present invention is directed.

OBJECTS AND SUMMARY OF THE INVENTION

It is a primary object of the present invention to provide a new position digital encoder which is not limited by the disadvantages characteristic of prior art encoders.

Another object is the provision of a new, relatively simple angular position digital encoder which does not employ brush contact or optical techniques.

A further object is to provide a relatively simple self-containing position encoder which provides digital output signals representing positions of a movable member without physically being connected thereto.

Still a further object is the provision of a position digital encoder which exhibits minimum wear, high digitizing speed and high output signals without amplification for a relatively long life without any required maintenance.

These and other objects of the invention are achieved by providing in one embodiment, an angular position digital encoder which consists of a sealed container filled with gas which has selected breakdown characteristics, enabling current to be conducted therethrough under given physical conditions. Within the container is supported a shaft which is magnetically coupled to a rotatable shaft outside the container, the angular position of which is to be encoded. Thus, the shaft in the container rotates in synchronism with the shaft to be encoded. On the shaft in the container is supported a coded disc having on at least one side thereof conductive and nonconductive surface portions, the combination of which, along each radial section represents a different angular position. A plurality of electrical probes are radially aligned in a selected configuration with the disc and adjacent thereto. The conductive portions of the disc are at the same potential such as ground while the probes are at a different potential such as negative with respect to ground.

As the disc rotates a certain pattern of conductive portions of the disc comes in immediate vicinity of the probes, and, due to the potential difference between the disc and the probes, the gas filling the container, breaks down between each conductive portion and a probe closest thereto, thus causing discharge thereacross and thereby electrically connecting the end of the probe closest to the disc to the disc's potential to provide an output signal. As a result, for each angular position of the disc, the probes closest to conductive portions of the disc provide signals of a first potential while those near non-conductive portions provide signals of a different potential. Similar principles are employed to provide digital signals representing linear positions of a linearly movable member.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
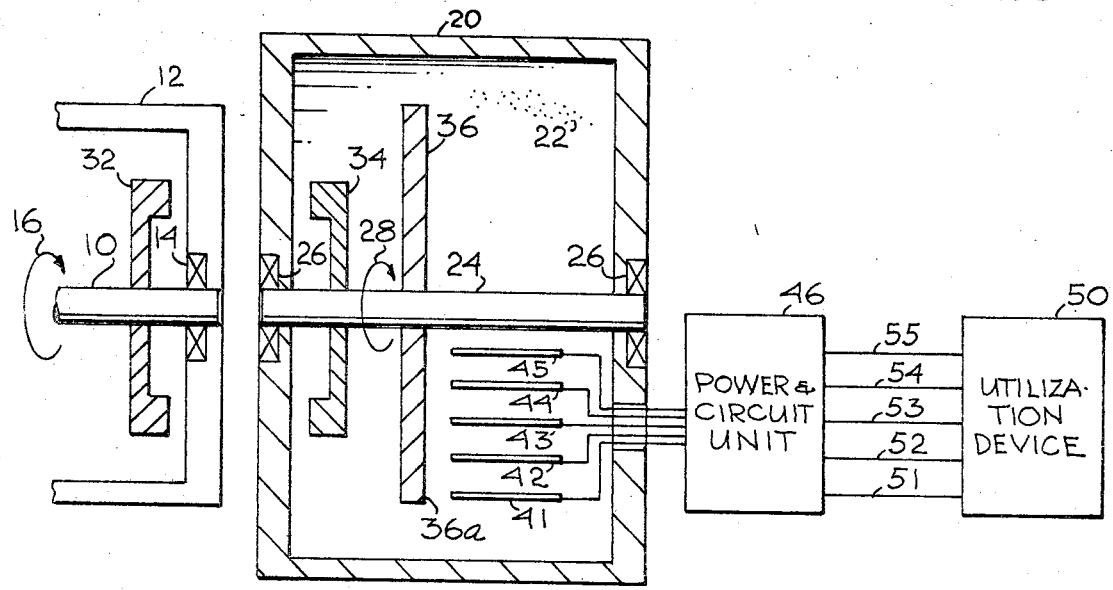
FIG. 1 is a combination cross-sectional view and block diagram of the angular position digital encoder of the invention.

Reference is now made to FIGURE 1 which is a simplified cross-sectional view and block diagram of one embodiment of an angular position digital encoder of the present invention. Therein, numeral 10 represents a rotatable shaft, the angular position of which is to be encoded. Shaft 10 is assumed to be supported within housing 12 by bearings 14, so as to be rotatable therein, as represented by arrow 16. The angular position encoder of the present invention comprises a gas-tight container 20, assumed to contain gas such as neon, which has discharge or breakdown characteristics when subjected to a potential difference of a given amplitude. The gas is represented in FIG. 1 by numeral 22. Within container 20 a shaft 24 is supported by bearings 26 so that shaft 24 can rotate about the longitudinal axis thereof within housing 20, as indicated by arrow 28.

A magnetic coupling arrangement is employed to rotatably couple shaft 24 within container 20 to the rotatable shaft 10 to rotate in synchronism therewith, even though shaft 24 is not physically coupled or connected to shaft 10. In FIG. 1 the magnetic arrangement is shown comprising permanent magnets 32 and 34, shown integrally supported on shafts 10 and 24 respectively. Thus, as is appreciated, as shaft 10 rotates the permanent magnet 32 thereon rotates therewith and due to the magnetic attraction of magnet 34 to magnet 32, shaft 24 rotates in synchronism with shaft 10. It should be appreciated, however, that any known techniques, other than those using permanent magnets, may be employed to cause shaft 24 to rotate in synchronism with shaft 10, without being physically connected thereto.

In addition, a disc 36 is integrally coupled or connected to shaft 24 within container 20. A plurality of electrical probes, designated 41–45 are positioned adjacent side 36a of disc 36. In the particular arrangement, diagrammed in FIGURE 1 the probes are positioned in a row, radially aligned with disc 36. The opposite ends of the electrical probes are connected through a gas-tight seal (not shown) to a power and circuit unit 46, which may be positioned external to container 20. Briefly, the function of unit 46 is to supply potentials to the probes, as well as to coded surface portions of disc 36, and to provide output signals, supplied to a utilization device 50 through output lines 51 through 55, each line supplying the output signal of another of the five probes.

Figure 2:
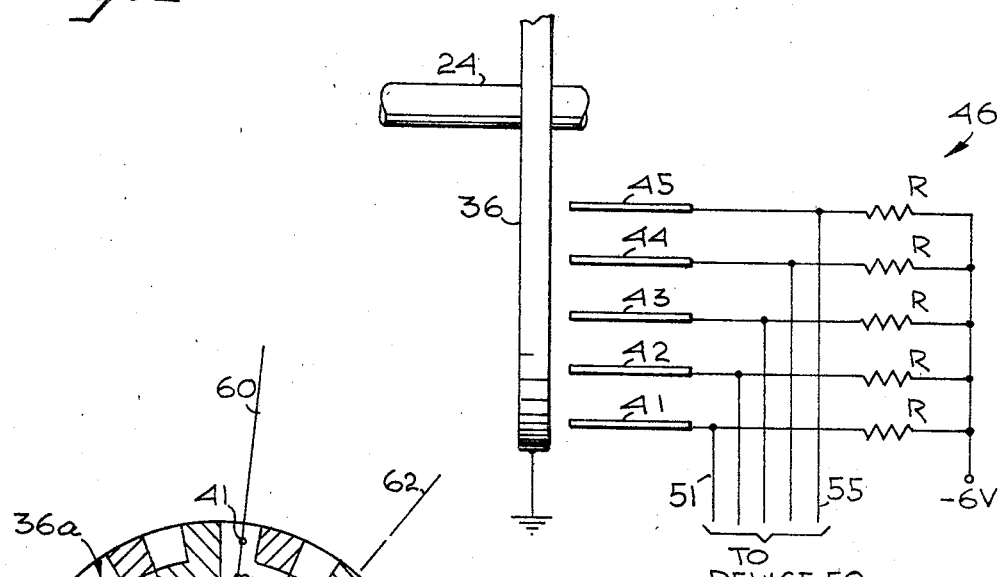
FIG. 2 is a schematic diagram of unit 46, shown in FIG. 1.

Reference is now made to FIG. 2 which is a combination schematic diagram of unit 46 and cross-sectional view of disc 36, mounted on shaft 24. As seen from FIGS. 1 and 2, while one end of each of the electrical probes 41 through 45 is positioned near disc 36, the other end thereof is connected within unit 46 to a potential level, designated −E volts, through another resistor, designated R. The junction point of each of the probes and its respective resistor R is connected to one of the output lines, such as 51 through 55, the other ends of which are connected to the utilization device 50. In addition, the disc 36 is assumed to be connected to another reference potential such as ground.

It is appreciated, by those familiar with the art, that as long as the space between the disc and the end of each of the probes adjacent thereto acts as an electrical open circuit, the potential at the junction point between each probe and its respective resistor is substantially equal to −E volts, since substantially zero current flow through its respective resistor. On the other hand, when the space between the disc and any of the probes act as a short circuit, a junction between the probe and its respective resistor may be thought of as being ground potential. Thus, the potential at each of the output lines connected to the device is either −E volts or ground depending on the electrical conduction between the disc and the probe.

In accordance with the teachings of the present invention, disc 36 is coded on side 36a thereof by being provided with conductive and nonconductive surface portions so that, the particular combination of portions in a radial line parallel to the row of probes closest to the disc, defines which of the probes are closest to conductive portions and which are adjacent to nonconductive portions. The space between the ends of probes 41 through 45 and disc 36 is filled with gas 22 which is at a pressure which is a function of the electrical conductive characteristics of the gas 22 in the container 20. As a result, when a conductive surface portion of disc 36 is closest the end of any of the probes, breakdown of the gas 22 occurs, providing a short circuit thereacross, a phenomenon similar to that occurring in known discharge type lamps. Such a short circuit in essence connects the probe and the junction point thereof with its respective resistor to the disc's potential, such as ground, so that a ground potential signal is provided to the utilization device by means of the output line connected thereto. For example, if the surface portion of disc 36 closest to probe 41 is conductive, thereby assumed to be connected to ground potential, the gas 22 therebetween breaks down providing a short thereacross so that the junction point of probe 41 is essentially at ground potential. As a result, the potential on output line 51 connected to the device 50 is at ground potential. On the other hand, if the surface portion of disc 36 closest to probe 41 is nonconductive, the potential on output line 51 remains at −E volts.

As is appreciated by those familiar with the art, various coding arrangement may be employed to code the surface 36a of disc 36 with conductive and nonconductive portions, so that different output signal combinations may be provided for any one of the angular positions of disc 36. One example of the coding arrangement of disc 36 is diagrammed in FIGURE 3 to which reference is made herein. Therein the dashed surface portions are assumed to represent conductive portions while the rest of the disc surface 36a is assumed to represent a nonconductive surface or portions. All the conductive portions are assumed to be connected to ground potential.

From the foregoing, it should be appreciated that when the angular position of disc 36 is that represented by line 60, none of the five probes is positioned in front of a conductive portion of surface 36a. As a result, the potentials on all of output lines 51 through 55 are −E volts. However, when the angular position of disc 36 would be that designated by line 62, it is appreciated from FIG. 3 that probes 41 and 42 would be closest to conductive portions while the other three probes (43, 44 and 45) will be positioned adjacent nonconductive portions. As a result, the potentials on lines 51 and 52 will be zero volts or ground while the potential on each of lines 53, 54 and 55 will be −E volts.

Figure 3:
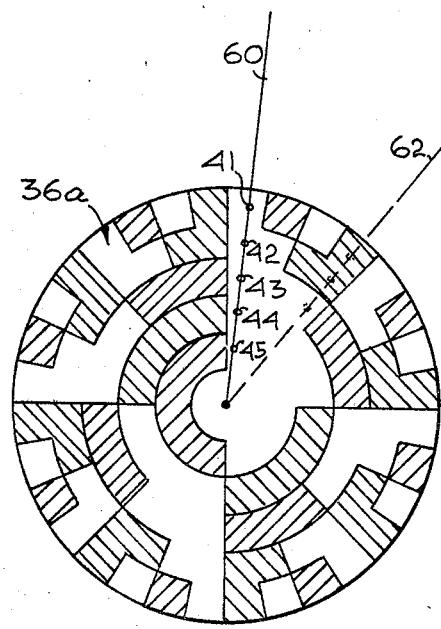
FIG. 3 is a top view of one embodiment of a coded disc.

The coding of disc 36 as diagrammed in FIG. 3 is a binary code. In the arrangement as shown, the disc 36 may be thought of as comprising of five concentric coded rings, each representing a different bit, so that the disc 36 is capable of indicating the position of shaft 10 to an accuracy of $\frac{1}{32}$ of a revolution, since the largest number representable by five (5) binary bits is $2^5=32$.

It should again be pointed out that different coding arrangements may be employed in coding disc 36 so that other than binary digital signals may be produced on the output lines 51 through 55. Furthermore, more than five probes may be employed along one or more rows, radially aligned with respect to the disc in order to increase the resolution with which the angular position of the disc 36, directly related to the angular position of shaft 10, may be encoded. Such coding techniques are well known in the art and therefore will not be described hereafter in further detail. Also, it should be appreciated that the disc may be coded on more than one side, with probes positioned near each coded surface. Furthermore, the arrangement of the probes need not be in straight rows, but rather any desired probe positioning arrangement may be employed. The only controlling feature is that for each angular position of the disc a different combination of probes is closest to conductive surface portions.

From the foregoing, it should thus be appreciated that in the novel angular position digital encoder of the present invention, output signals are produced without mechanical contacts on the coded surface of disc 36, as well as, without any optical arrangements which, as hereinbefore indicated, require a continuous light source and a plurality of photocells, generally producing very low signals which require amplification. The basic principle, utilized in the present invention, is the use of the gas which breaks down whenever a conductive portion of surface 36 is closest to any of the probes. That is when the distance between a probe and the conductive portion is equal or less than a critical value, the gas between the probe and the conductive portion breaks down. As a result, a virtual short circuit is provided between the disc and the probe, thereby controlling the output signal which the probe produces.

It should be pointed out that the output signals need not be amplified since they may be directly related to and equal to the potential difference between the potential of disc 36 and the potential to which the resistors R are connected. Thus, in the foregoing example, the output signal on each of the output lines is either ground or —E volts. The value of —E volts may be made large enough so that a sufficiently large potential difference is produced to actuate any utilization device without amplification. For example, the voltage difference may be made large enough to energize lamps, as well as, actuate any binary circuits in any computer to which the angular position of the shaft may be supplied.

It should further be pointed out, that although in FIG. 1 the disc 36 is shown mounted on a secondary disc 24 within the gas container 20, with the shaft 24 being magnetically coupled to rotate in synchronism with shaft 10, the invention need not be limited to such an arrangement. Whenever shaft 10 is adapted to be enclosed in a gastight container, such as container 20. The use of the magnets 32 and 34 as well as the secondary shaft 24 may be dispensed with, and the disc 36 may be directly mounted on shaft 10 with the probes adjacent thereto. In such an arrangement housing 12 will form a gas-tight housing to house the probes disc 35 and contain the gas 22. However, whenever the shaft 10, which may be regarded as the input shaft, cannot be practically enclosed in a gastight container, the arrangement shown in FIG. 1 is preferable. Once the encoder, hereinbefore described in properly adjusted and operable, it requires minimum of maintenance, since the entire encoder is enclosed within the gas-tight container 20. As is appreciated, by those familiar with the art, different gases are presently available, any one of which may be used to fill container 20. Among such gases are neon, argon- crypton and xenon, listed for explanatory purposes only.

Figure 4:
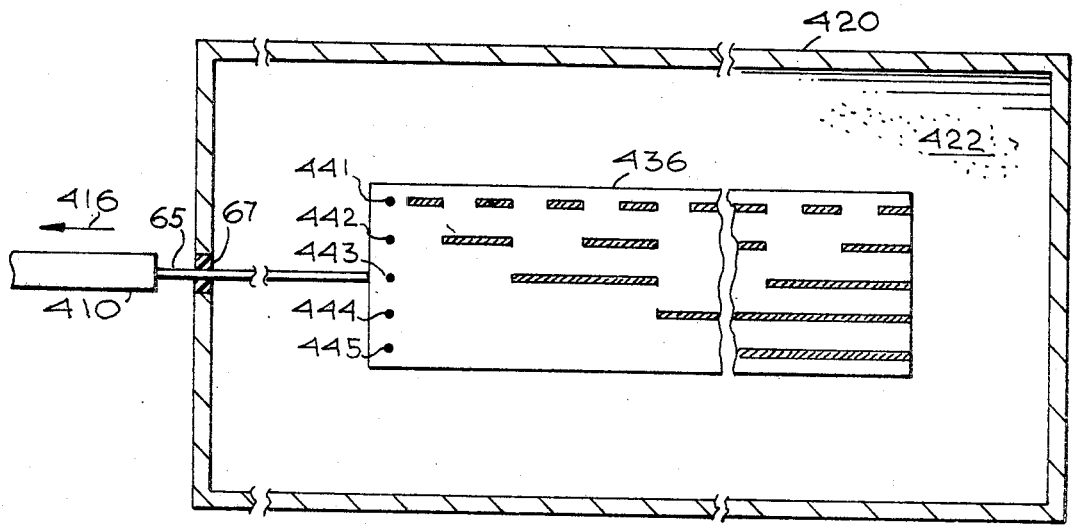
FIG. 4 is a cross-sectional view of a linear position digital encoder.

Although in the foregoing description, an angular position digital encoder has been described, the invention is not limited to an angular position encoder only. Rather, the teachings, hereinbefore disclosed, are similarly applicable to provide digital signals representing linear positions of a movable member, such as a shaft. An arrangement in accordance with the teachings of the present invention for providing digital signals in response to linear positions is diagrammed in FIG. 4, to which reference is made herein. In FIG. 4, elements similar to those hereinbefore described, are designated by like numerals with the number 4 preceding each of the numerals. Thus, in FIG. 4, numeral 420 represents a gas-tight container, filled with conductive gas 422. A shaft 410 assumed to be linearly movable as indicated by double-headed arrow 416, is connected by means of a connecting rod 65 through a gas seal 67 in container 420 to a coded plate 436, positioned within container 420. Shaft 410 is assumed to be positioned in the most extreme right-hand linear position thereof.

The plate 436, like disc 36, hereinbefore described, comprises a plurality of strips, coded with conductive and nonconductive surface portions. The conductive surface portions are designated by the hatched areas. In the arrangement shown in FIG. 4, plate 436 is also assumed to be coded in a binary code. Five electrical probes, designated 441 through 445 are positioned adjacent 436, each probe aligned with respect to another strip of plate 436. The probes may be thought of as being aligned in a row, perpendicular to the linear motion of the shaft 410.

From the foregoing description it should be appreciated that, for the position of 410, as diagrammed in FIG. 4, since none of the five probes is positioned adjacent a conductive portion of plate 436, the outputs of the five probes will all be —E volts. However, as shaft 410 is moved to the left and plate 436 is similarly moving in the same direction by means of the coupling rod 65, different combinations of conductive and nonconductive portions of the surface of plate 436 will appear under the five probes, so that different combinations of five output signals will be produced by the five probes. Thus, for the arrangements shown in FIG. 4, the linear position digital encoder is capable of indicating the linear position of shaft 410 to an accuracy of $1/32$, since a five-bit code is employed. It should be pointed out that in FIG. 4, the connections between the various probes and the conductive portions of plate 436 to a power and circuit unit similar to unit 46 are deleted, since such connections have been previously shown and described.

Figure 5:
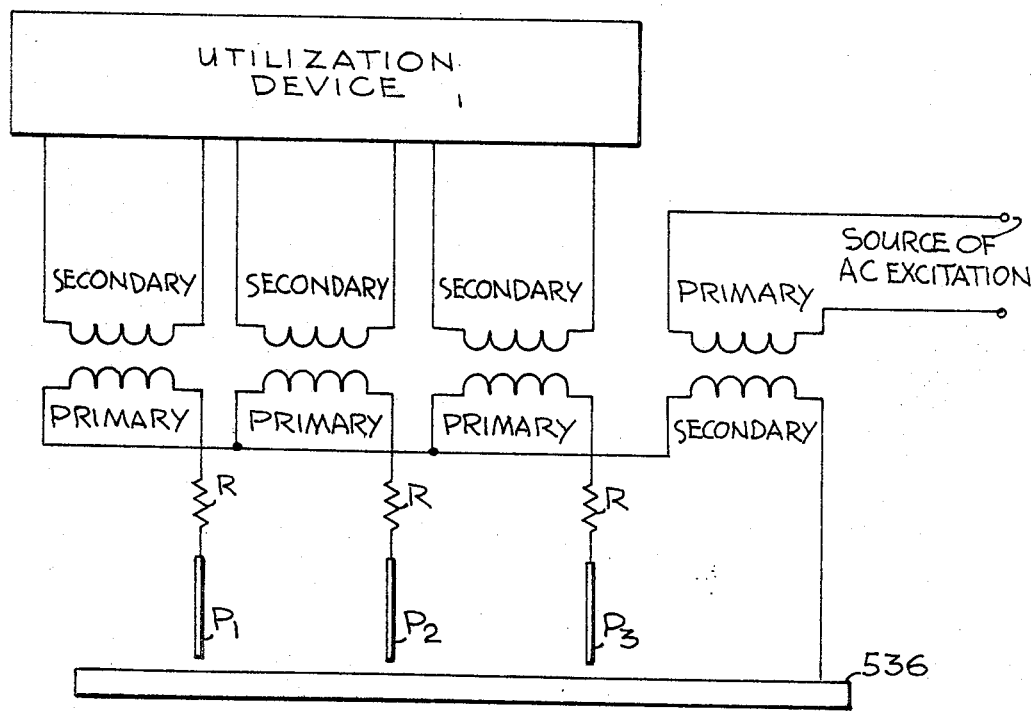
FIG. 5 is a schematic diagram of circuitry, employed in one embodiment of the invention, excitable by AC potentials.

Although herebefore the invention has been described in conjunction with DC potential levels (ground and —E volts), the invention is not intended to be limited thereto. In some applications it may be desirable to excite the encoder with AC potentials. One arrangement, in which AC source is used for excitation purposes and each probe closest to a conductive portion of the coded member (either disc 36 or plate 436), is diagrammed in FIG. 5, to which reference is made herein. Therein the coded member is designated by numeral 536, and $Tx$ designates an excitation step-up transformer, having its primary winding designated "primary" connected to a source of AC excitation potential, such as 6 volts. The secondary winding of $Tx$ is connected between the coded member 536 in one end of the primary winding of each of transformers T1, T2 and T3. The other ends of the primary windings of T1, T2 and T3 are connected to respective probes P1, P2 and P3, through resistors R. Only three probes and transformers are shown for explanatory purpose though any number of probes and transformers may be applied. The secondary windings of T1, T2 and T3 are assumed to be connected to a utilization device, such as device 50 (FIGURE 1).

As should be appreciated, when the primary of $Tx$ is excited a voltage is induced in the secondary winding thereof. However, only when a probe, such as P1, is closest to a conductive portion of 536 does the gas therebetween discharge so that the primary of T1 in series with R, is connected in parallel across the secondary of $Tx$. As a result, the primary of T1 is excited inducing a voltage in the secondary connected to the utilization device. If however, a probe is not near a conductive portion, the primary of the transformer connected thereto is not excited and therefore the secondary of the transformer does not provide an AC signal to the utilization device. The arrangement shown in FIG. 5 may, in some applications be preferred, since the primary of $Tx$ and the secondaries of T1, T2 and T3 may be positioned external to the gastight container with magnetic coupling accomplished through the container, thereby eliminating the need for a gas-tight seal through which wires extend through the container.

There has accordingly been shown and described herein a novel digital encoder for encoding either angular position or linear position of a rotatable or movable member, such as a shaft. The encoding is accomplished by utilizing the break down properties of gas when subjected to a potential difference thereacross, in order to provide digital output signals from a plurality of probes. Signals of sufficient amplitude which do not require amplification, are achieved without resort to mechanical contacts which are required to make contact with a rotatable or moving member, as well as, without the need of a continuously energized light source and associated optical circuitry required therefor. Thus, a highly reliable position digital encoder which is subjected to minimum wear and therefore has a long operative life with minimum maintenance is provided.

It should be appreciated that those familiar with the art may, in light of the teachings hereinbefore disclosed, make modifications and/or substitute equivalents in the arrangements as shown without departing from the true spirit of the invention.

For example, as previously generalized, the disc may be coded on more than one side and the probes need not be arranged in straight rows. Also, as previously explained, the encoder may be operated with either DC or AC potential sources. Therefore, all such modification and/or equivalents are deemed to fall within the scope of the invention as claimed in the appended claims.

I claim:
1. A position-to-digital encoder comprising:
   a gas-tight chamber;
   a movable coded member in said chamber, having at least one side of the surface thereof coded with conductive and nonconductive surface portions, all the conductive surface portions being at the same potential;
   a plurality of probes in said container, each having first and second ends, the first ends of said probes being arranged, adjacent said at least one side of the coded surface of said code member, in a preselected relationship which is a function of the coding of said member and the motion thereof;
   a gas, other than air, having breakdown characteristics as a function of potential difference thereacross, filling said chamber, said gas breaking down between the first end of a probe and a conductive surface portion closest thereto when the potential difference between the probe and the conductive surface portion is not less than a selected value, to provide substantially an electrical short therebetween; and
   output means coupled to the second ends of said probes and electrically coupled to the conductive surface portions of said coded member, said output means including means adapted to be connected to a source of electrical excitation to provide a potential difference between said conductive surface portions and said probes, whereby probes closest to conductive surface portions provide digital output signals of a first value and probes not adjacent conductive surface portions provide digital output signals of a second value.

2. A position-to-digital encoder as recited in claim 1 wherein:
   said output means include means for coupling the conductive surface portions of said member to a first DC reference potential and the second ends of said probes to a second DC reference potential through resistive means.

3. A position-to-digital encoder as recited in claim 2 wherein:
   said movable coded member is a disc rotatable in said container filled with said gas, the disc having a plurality of concentric code rings each ring having conductive and nonconductive portions, at least some of said probes being arranged radially parallel to said disc, whereby at least one probe is positioned adjacent each ring to provide a first digital output signal when the first end thereof is opposite a conductive surface portion of said ring and a second digital output signal when the first end thereof is opposite a nonconductive surface portion.

4. A position-to-digital encoder as recited in claim 3 further including:
   means for coupling said rotatable coded disc to an input rotatable shaft outside said container so that said disc rotates in synchronism with the input rotatable shaft.

5. A position-to-digital encoder as recited in claim 4 wherein said means for coupling include a second shaft rotatably supported within said container, said disc being integrally supported thereon and magnetic coupling means, magnetically coupling said second shaft to rotate in synchronism with the input rotatable shaft.

6. The position-to-digital encoder as recited in claim 2 wherein:
   said movable coded member is a coded plate movable in either of two directions along a selected longitudinal axis, said member defining coded strips parallel to said axis, each strip including conductive and nonconductive surface portions, said probes being arranged with their first ends in a row perpendicular to said longitudinal axis, with each probe adjacent one coded strip providing a first digital signal when the first end thereof is opposite a conductive portion of the coded strip, and a second digital signal when the first end thereof is opposite a nonconductive portion of the coded strip.

7. A position-to-digital encoder as recited in claim 1 wherein said output means include:
   an excitation transformer having a primary winding adapted to be connected to a source of AC excitation potential and a secondary winding coupled at one end to said coded member and the other end to one end of the primary winding of each of a plurality of probe transformers; and
   means connecting each probe to the other end of the primary winding of one of said probe transformers, said probe transformers having secondary windings adapted to be connected to means utilizing signals induced therein as a function of the breakdown of said gas between said coded member and the probe coupled to the transformer thereof.

8. A position-to-digital encoder as recited in claim 7 wherein said movable coded member is a disc rotatable in said container filled with said gas, the disc having a plurality of concentric code rings each ring having conductive and nonconductive portions, at least some of said probes being arranged radially parallel to said disc, whereby at least one probe is positioned adjacent each ring to provide a first digital output signal when the first end thereof is opposite a conductive surface portion of said ring and a second digital output signal when the first end thereof is opposite a nonconductive surface portion.

9. A position-to-digital encoder as recited in claim 8 wherein:
   said movable coded member is a coded plate movable in either of two directions along a selected longitudinal axis, said member defining coded strips parallel to said axis, each strip including conductive and nonconductive surface portions, said probes being arranged with their first ends in a row perpendicular to said longitudinal axis, with each probe adjacent one coded strip providing a first digital signal when the first end thereof is opposite a conductive portion of the coded strip, and a second digital signal when the first end thereof is opposite a nonconductive portion of the coded strip.

References Cited

UNITED STATES PATENTS

| | | | |
|---|---|---|---|
| 3,209,345 | 9/1965 | Litte | 340—347 |
| 3,218,635 | 11/1965 | Masur | 340—347 |
| 3,218,647 | 11/1965 | Fenner | 235—61.116 |
| 3,286,252 | 11/1966 | Bose | 340—347 |
| 3,371,336 | 2/1968 | Bennett | 340—347 |
| 3,428,782 | 2/1969 | Schmidt | 346—745 |
| 3,085,407 | 4/1963 | Homlinson | 64—6 |

MAYNARD R. WILBUR, Primary Examiner

J. GLASSMAN, Assistant Examiner